United States Patent
Hagg

(10) Patent No.: US 8,558,951 B2
(45) Date of Patent: Oct. 15, 2013

(54) METHOD, DEVICE AND SYSTEM FOR SYNCHRONIZING AUDIO/VIDEO SIGNALS

(75) Inventor: Wilhelm Hagg, Korb (DE)

(73) Assignee: Sony Corporation, Tokyo (JP)

( * ) Notice: Subject to any disclaimer, the term of this patent is extended or adjusted under 35 U.S.C. 154(b) by 811 days.

(21) Appl. No.: 12/361,013

(22) Filed: Jan. 28, 2009

(65) Prior Publication Data

US 2009/0207306 A1   Aug. 20, 2009

(30) Foreign Application Priority Data

Feb. 14, 2008   (EP) ..................................... 08002739

(51) Int. Cl.
*H04N 9/475* (2006.01)
*H04N 5/932* (2006.01)
*H04N 7/18* (2006.01)

(52) U.S. Cl.
USPC .............. 348/515; 348/512; 386/201; 725/80

(58) Field of Classification Search
None
See application file for complete search history.

(56) References Cited

U.S. PATENT DOCUMENTS

| 2006/0127053 | A1* | 6/2006 | Lee ................................... 386/96 |
| 2006/0290810 | A1* | 12/2006 | Mallinson ..................... 348/515 |
| 2007/0220561 | A1* | 9/2007 | Girardeau et al. .............. 725/80 |

FOREIGN PATENT DOCUMENTS

EP    1 702 339 A2   11/2006
WO    WO 2006/008696 A1   1/2006

OTHER PUBLICATIONS

Office Action issued Sep. 28, 2011, in Chinese Patent Application No. 200910126786.0 (with English-language translation).

* cited by examiner

*Primary Examiner* — Jefferey Harold
*Assistant Examiner* — Sean Haiem
(74) *Attorney, Agent, or Firm* — Oblon, Spivak, McClelland, Maier & Neustadt, L.L.P.

(57) ABSTRACT

A method and device for synchronizing audio/video signals is provided. A first and a second auxiliary signal are generated, wherein the first and the second auxiliary signals are pulse-shaped, and transmitted to a first and a second rendering device via a first and a second transmission path, respectively. The first audio/video output signal based on the first auxiliary signal and a second audio/video output signal based on the second auxiliary signal are outputted to a user. The user adjusts a delay of the first and/or second transmission path by synchronizing the first audio/video output signal with the second audio/video output signal.

7 Claims, 8 Drawing Sheets

METHOD, DEVICE AND SYSTEM FOR SYNCHRONIZING AUDIO/VIDEO SIGNALS

An embodiment of the invention relates to a method, a device and a system for synchronizing audio/video signals. A further embodiment of the invention relates to a method and device for measuring a value of a delay of a first rendering device.

BACKGROUND

Measuring delay values of rendering devices is a complex task that requires a sophisticated setup with microphones. This puts a huge burden on device manufacturers in terms of product qualification and quality assessment. In the Bluetooth standard there is a test suit available that can be installed easily on a personal computer (PC) and then run the tests. It is currently not possible to verify the correct synchronization between audio and video devices with such a setup.

It is an object of the invention to provide a method and device for synchronizing audio/video signals which is able to calibrate rendering devices and measure precisely delay times of rendering devices.

This object is solved by a method according a device and a method for measuring a delay as described herein.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention.

The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
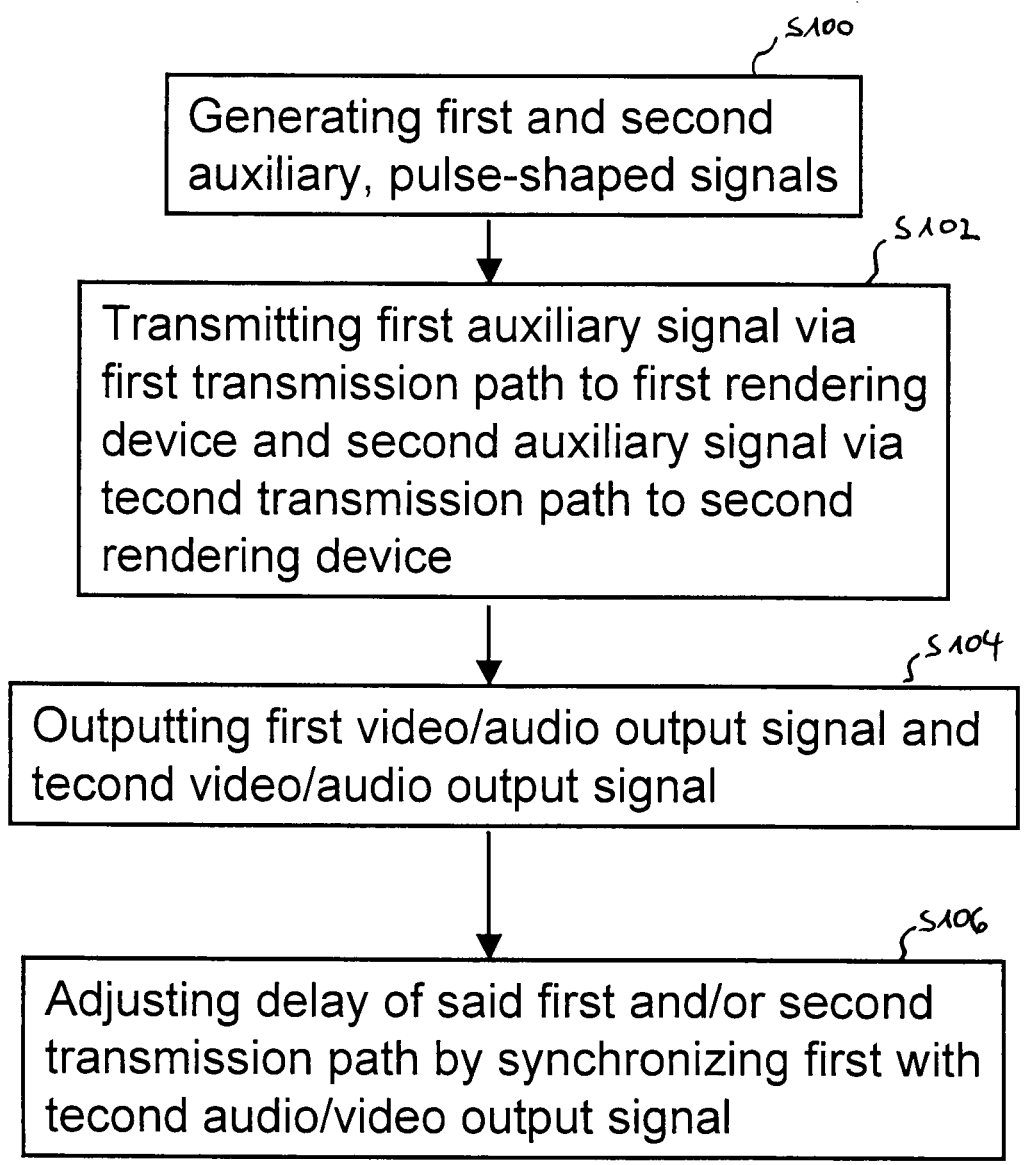
FIG. 1 shows method steps according to a first embodiment of the invention.

In FIG. 1 a flowchart of a method according to an embodiment of the invention is depicted. In S100 a first and a second auxiliary, pulse-shaped signals are generated. The pulse-shaped signals might also be referred to as clock pulse signals.

The first and the second auxiliary signals might be derived from a common signal, which results in an easier way to ensure a precise timing relationship between the first and the second auxiliary signal.

The first auxiliary signal is transmitted via a first transmission path to a first rendering device and the second auxiliary signal is transmitted via a second transmission path to a second rendering device in S102. The first and/or second rendering device might render analog or digital signals and the first and second auxiliary signals might be video and/or audio signals. Thus, the rendering devices might be loudspeakers, headphones, displays or any other rendering device suited to render video/audio signals.

In S104 corresponding first video/audio output signals and second video/audio output signals rendered by the corresponding first and second rendering device are outputted.

In S106 a delay of the first and/or second transmission path is adjusted by synchronizing the first audio video output signal with the second audio/video output signal.

The transmission path might be any combination of wired and/or wireless communication path suitable to transmit the first and second auxiliary signal to the rendering device.

The delay is adjusted, by a user, e.g. in the case of audio signals by finding a delay at which both audio output signals from the first and the second rendering device are heard simultaneously.

The duration of the pulse-shaped signals is chosen to provide a sufficiently precise synchronization.

After having synchronized the audio/video signals in accordance to the described method, the delay of the first and/or second transmission path is kept for further data streams or signals that are transmitted from data or signal sources to the rendering devices. The rendering devices might also be referred to as data sinks or signal sinks.

Figure 2:
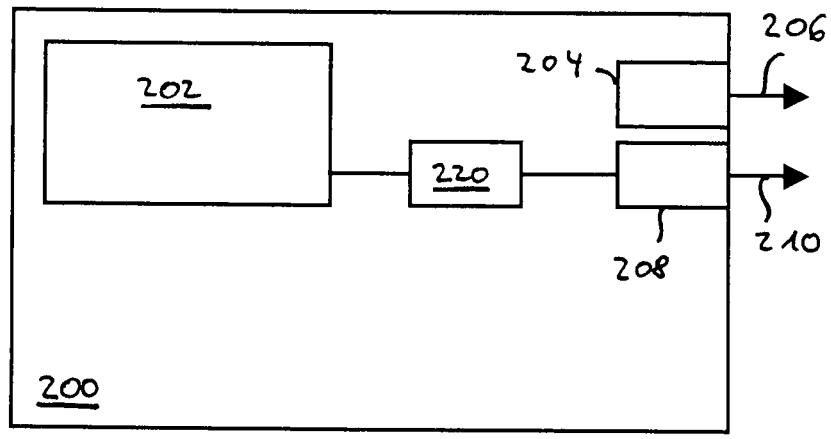
FIG. 2 shows a block diagram of a device according to a further embodiment of the invention.

In FIG. 2 a device 200 for synchronizing audio/video signals is depicted.

The device 200 for synchronizing audio/video signals comprises a signal generator 202 configured to generate a first and a second auxiliary signal, wherein said first auxiliary signal and said second auxiliary signal are pulse-shaped.

The device 200 further comprises a first transmitter 204 configured to transmit said first auxiliary signal via a first transmission path 206 to a rendering device (not depicted). Further on a second transmitter 208 is provided which is configured to transmit the second auxiliary signal via a second transmission path 210 to a further rendering device (not depicted). A delay unit 220 is included within the device 200, the delay unit 220 being configured to adjust a delay of said first and/or said second transmission path 210.

With the delay unit 220 the delay of the first/second transmission path 206, 210 might be adjusted by a user until the delays on both transmission path 206, 210 might give the impression to the user that the delays are the same.

Figure 3:
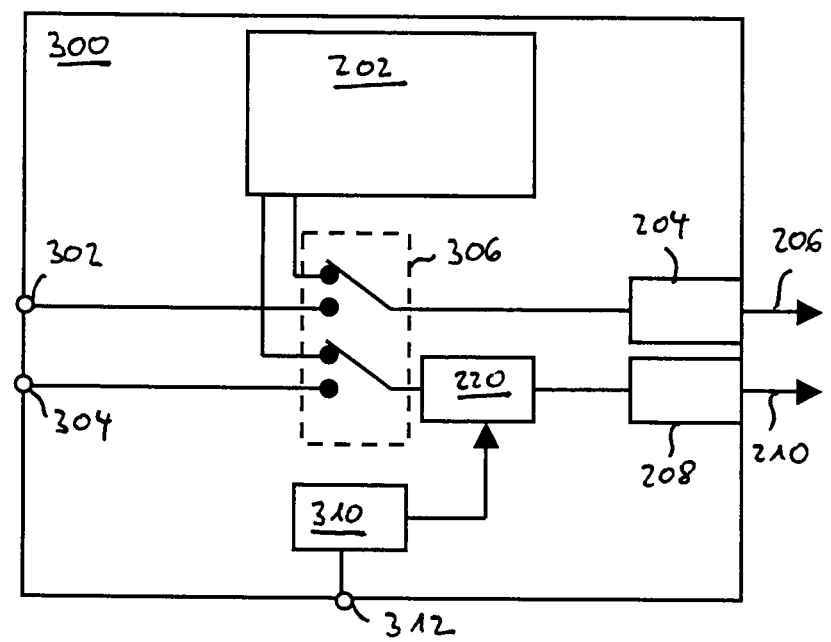
FIG. 3 shows a block diagram of a device according to a further embodiment of the invention.

In a further embodiment in FIG. 3 a block diagram of a further device 300 is depicted which comprises the first audio/video input 302 and a second audio/video input 304. The first audio/video input 302 is connected via a switching unit 306 to a first transmitter 206. The second audio/video input 304 is connected via the switching unit 306 and the delay unit 220 to the second transmitter 210.

Further on, the device 300 comprises the signal generator 202 configured to generate the first and the second auxiliary signal. The signal generator is also connected to the switching unit 306. The delay unit 220 is controlled via a control unit 310 which is connected to an input 312.

The device 300 for synchronizing audio/video signals works as follows. The switching unit 306 is configured to switch between a first position that is configured to transmit the auxiliary signals generated from the signal generator 202 to the first and second transmitters 204, 208 or a second position that is configured to transmit audio/video input signals from the first audio/video input 302 and the second audio/video input 304 to the first and second transmitter 204, 208.

In case a user wants to synchronize the audio/video signals the signal generator 202 generates the first and the second auxiliary signals which are transmitted via the switching unit 306 to the first and second transmitter 204, 208 which transmit the auxiliary signals via the first transmission path 206 and the second transmission path 210 to corresponding first and second rendering devices. A user might input feedback signals via the input 312 to the control unit 310 which adjusts the delay of delay unit 220. The delay unit 220 adjusts the delay of the second transmission path 210 based on the feedback signals until a synchronization of the outputted audio/video signals from the first and second rendering devices is achieved and the user is satisfied. The satisfaction of the user might result in no further feedback signals.

Afterwards the switching unit 306 is switched to the second position so that the audio/video signals inputted at the first audio/video input 302 and the second audio/video 304 are transmitted via the first transmission path 306 and the second transmission path 310 to the rendering devices. Since the delay unit 220 is adjusted so that the delay of the second transmission path 310 is, e.g. the same as on the first transmission path 306 the first and second audio/video signal are rendered synchronously from the first and second rendering device.

Figure 4:
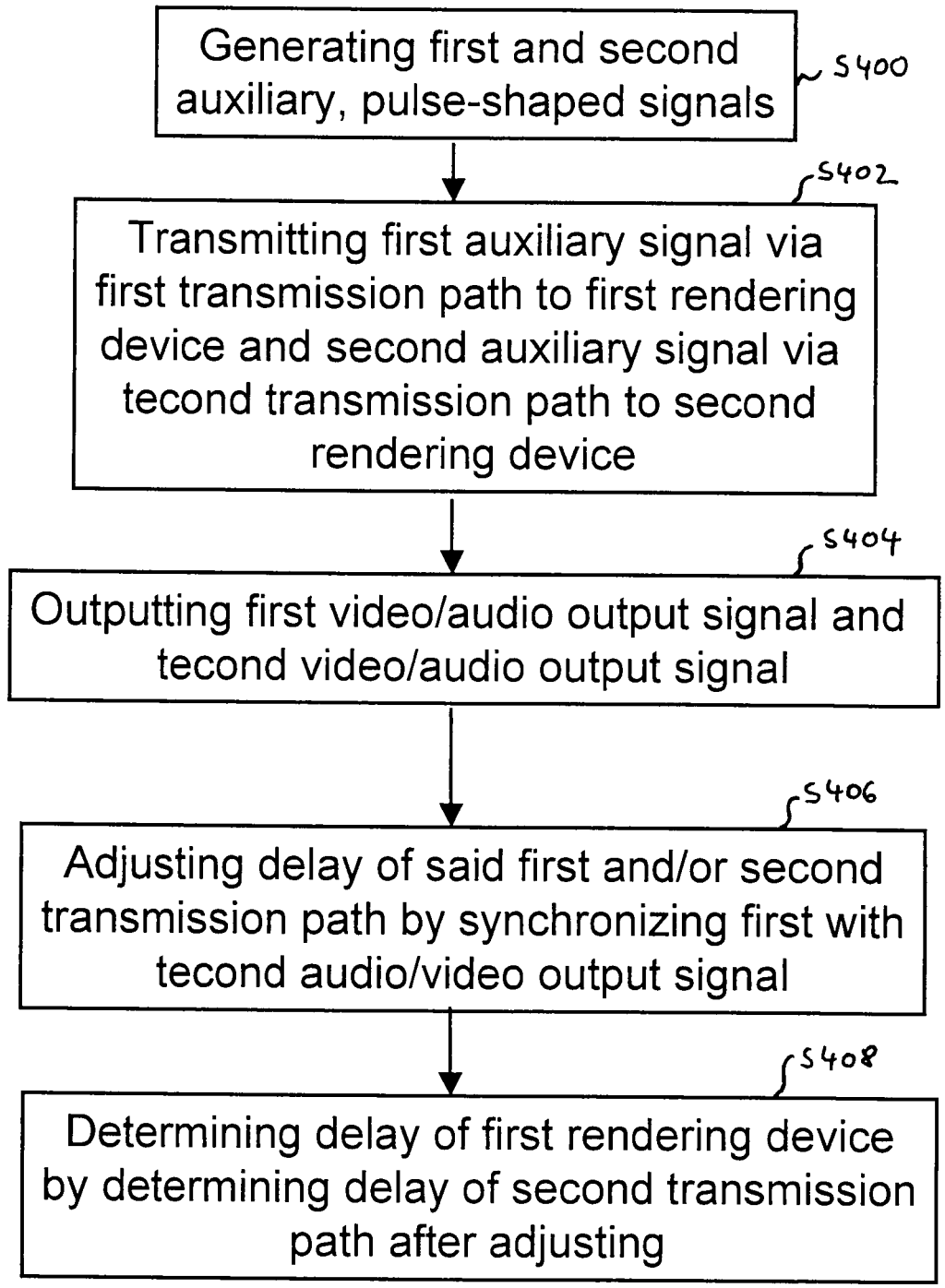
FIG. 4 shows method steps according to a further embodiment of the invention.

In FIG. 4 a method for measuring a delay of the first rendering device is depicted.

In S400 the first auxiliary, pulse-shaped signals and a second auxiliary, pulse-shaped signals are generated.

The first auxiliary signal is transmitted via a first transmission path to a first rendering device and the second auxiliary signal is transmitted via a second transmission path to a second rendering device in S402.

The first and the second auxiliary signals are outputted as first and second audio/video output signals from the corresponding rendering devices in S404.

A user adjusts a delay of the first and/or second transmission path by synchronizing the first with the second audio/video signal in S406.

The delay of the first rendering device is determined by determining the delay of the second transmission path after adjusting in S408. The delay of the second transmission path after adjusting is precisely known beforehand, for instance because the adjustment has been calibrated by precisely measuring the delay with a separate arrangement.

Figure 5:
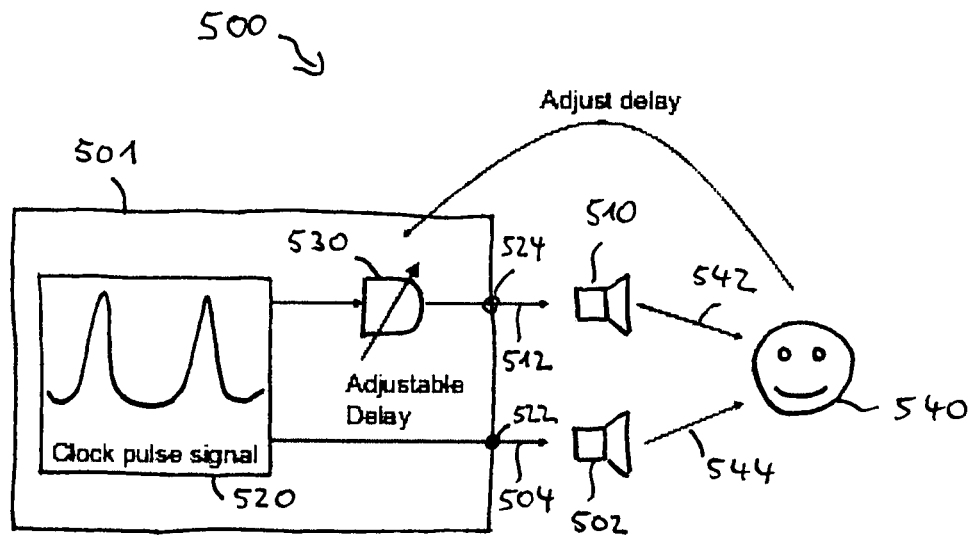
FIG. 5 shows a schematic block diagram of a device according to a further embodiment of the invention.

In FIG. 5 a schematic block diagram of a system for synchronizing audio/video signals is depicted. The system 500 comprises the synchronization unit 501, a first rendering device 502 coupled to said synchronization unit 501 by a first transmission path 504 and a second rendering device 510 coupled to the synchronization unit 501 via a second transmission path 512. The synchronization unit 501 includes a signal generator 520 configured to generate a first and a second auxiliary signal wherein the first auxiliary signal and the second auxiliary signal are pulse-shaped.

Further on the synchronization unit 501 includes a first transmitter 522 configured to transmit the first auxiliary signal via the first transmission path 504 and a second transmitter 524 configured to transmit the second auxiliary signal via a second transmission path 512. Further on the synchronization unit 501 includes a delay unit 530 configured to adjust a delay of the first transmission path 504 and/or the second transmission path 512. A user 540 can listen to outputted audio/video signals 542 and 544 and adjust the delay of the delay unit 530 until the output signals 542 and 544 are synchronized.

Figure 6:
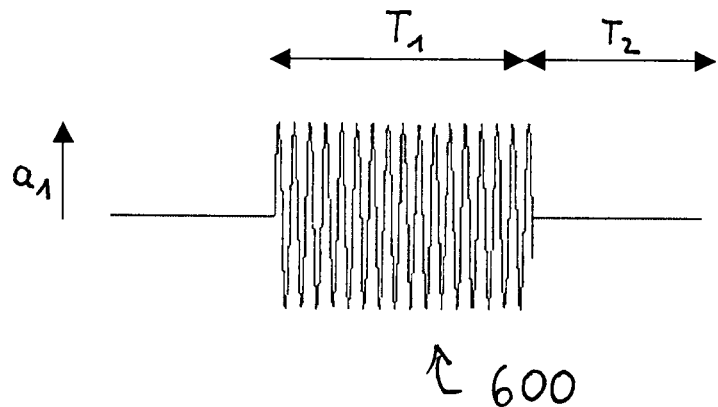
FIG. 6 shows an exemplary pulse-shaped signal used within embodiments of the invention.

In FIG. 6 a schematic view graph of a pulse-shaped signal 600 is depicted which comprises during a time interval T1 a sinusoidal signal as an amplitude a1 and in a time interval T2 adjoining the first time interval T1 no signal. Such a signal might be repeated several times in order to facilitate the delay adjustment.

As it has been explained above, the manual synchronization of a pair of rendering devices is performed by sending a clock pulse reference signal 600 to a pair of rendering devices 502, 510. The signal sent to one of the devices is delayed by an artificial, adjustable delay unit 530. Based on the perception of the peaks from both rendering devices 502, 510 a user 540 is able to precisely adjust the amount of the delay so that both rendering devices 502, 510 are well synchronized. The synchronization method can be applied to a pair of audio devices, a pair of video devices or to an audio and a video device.

Figure 7:
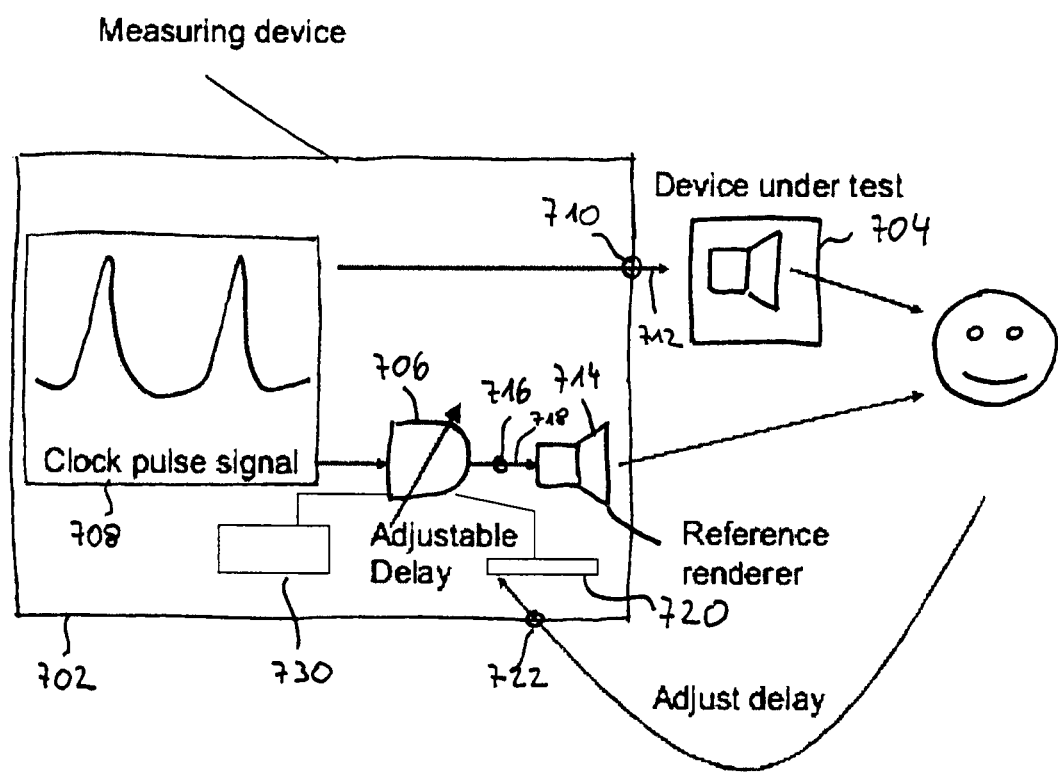
FIG. 7 shows block diagram of a measuring device according to a further embodiment of the invention.

In FIG. 7 a block diagram of a measuring device 702 in combination with the device under test 704 is depicted. The measuring device 702 comprises an adjustable delay unit 706 and a signal generator 708. The signal generator 708 is configured to generate a first and a second auxiliary signal, wherein said first auxiliary signal and a second auxiliary signal are pulse-shaped. The signals might e.g. be referred to as clock pulse signal.

The measuring device 702 includes a first transmitter 710 configured to transmit the first auxiliary signal by a first transmission path 712. The measuring device 702 further includes a second rendering device 714 and a second transmitter 716 configured to transmit the second auxiliary signal via a second transmission path 718 to the second rendering device 714. The delay unit 706 is configured to adjust the delay of the first and/or second transmission path 712, 718.

A control unit 720 is provided including an input port 722, said control unit being configured to adjust the delay of the delay unit 706 based on feedback signals on the input port 722. Further on the measuring device includes an output unit 730 configured to output the delay of the measuring device 710. The second rendering device 714 and the measuring device 702 which acts as a reference renderer might have a certain delay that is one source of inaccuracy. A reference rendering device with a very precisely known, constant delay might be used to calibrate the measuring device.

In order to translate the delay in terms of processor cycles into a real delay value, the measuring device 702 might regularly update its global time base from a time server and determined the clock frequency from the global time differences within an interval defined by a number of local cycles.

As the proposed measuring method and device do not require specific hardware such as microphone, a measuring device 702 might be realized by a personal computer (PC, laptop) by installing the software package. Audio and video rendering devices like loudspeakers or displays are usually available and the clock pulse signal as well as the adjustable delay unit 706 can be implemented in software.

Such a software-based measuring unit might again be calibrated by a reference rendering device 702 which could be an off-the-shelf product with a well known delay. This also allows to compensate for different delays introduced by the communication hardware and protocol stacks, as for example in a wireless data transmission between the devices.

The measurement of delay values might be used for product quality assurance as well as for product specification. The method might also be used for high quality manual calibration of devices.

Figure 8:
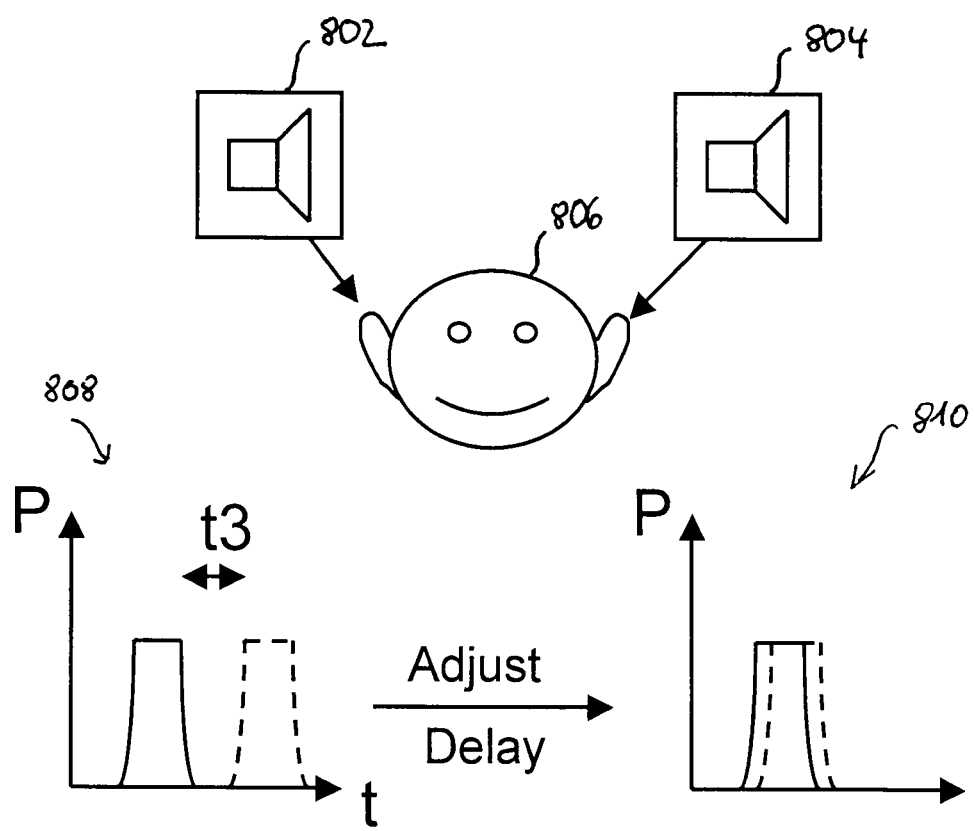
FIG. 8 shows a schematic view graph in order to illustrate a further embodiment of the invention.
Figure 9:
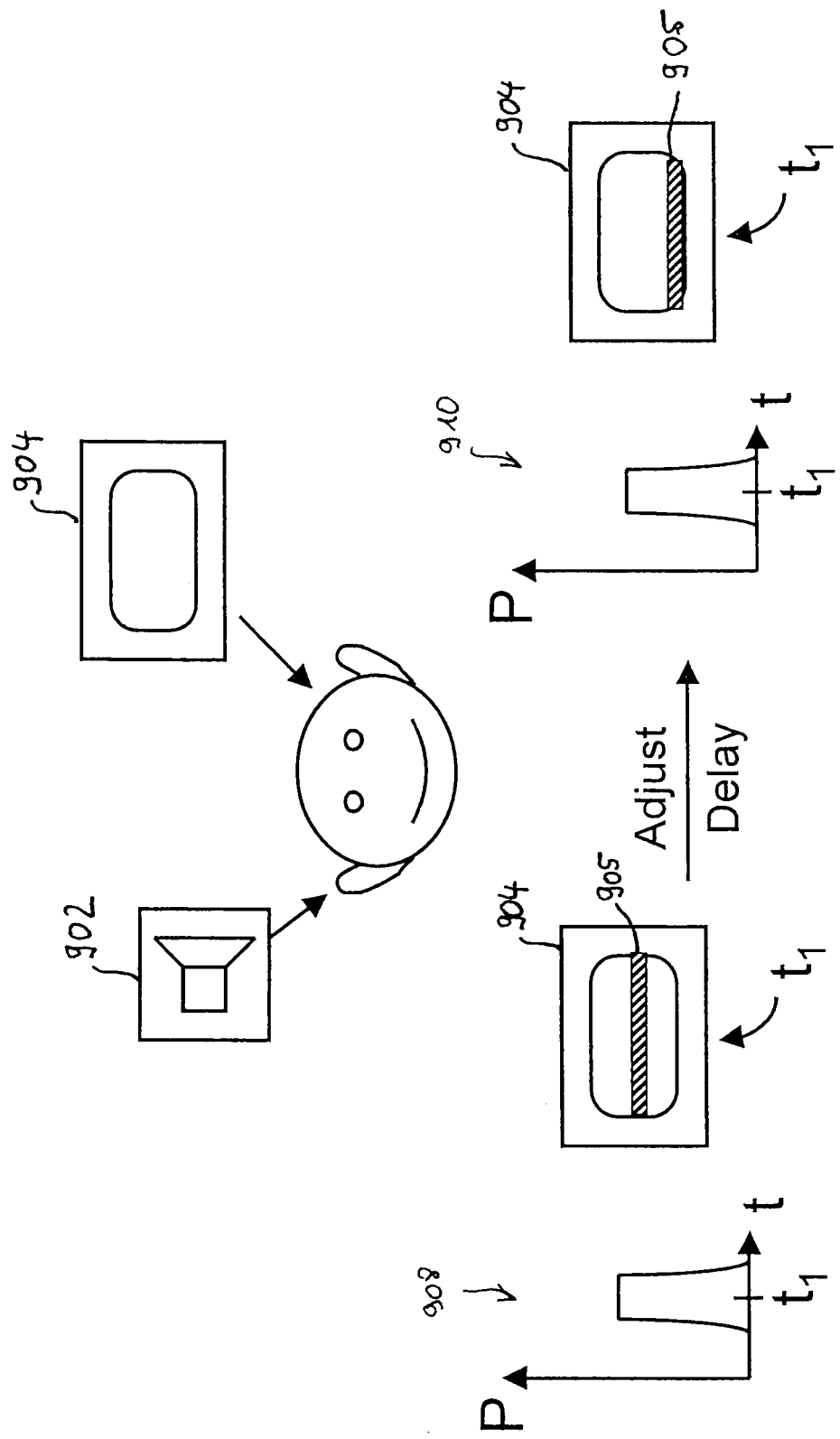
FIG. 9 shows a schematic view graph illustrating a further embodiment of the invention and FIG. 10 shows a schematic view graph illustrating a further embodiment of the invention.
Figure 10:
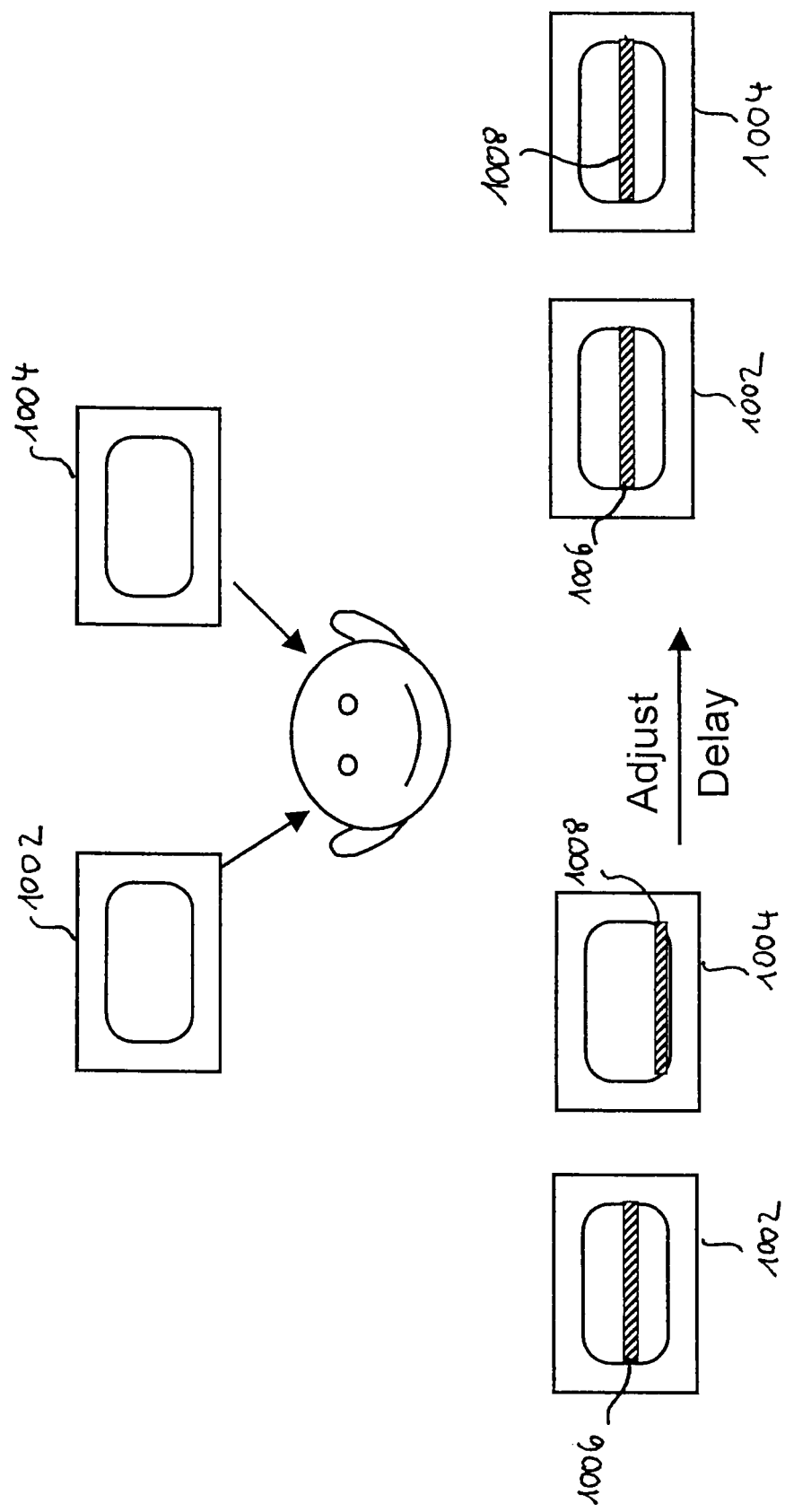

In FIGS. 8, 9 and 10 three possible embodiments are schematically depicted.

In FIG. 8 a first loudspeaker 802 and a second loudspeaker 804 are used as rendering devices. A user 806 listens to the audio signals which are rendered from the first loudspeaker 802 and the second loudspeaker 804. Before adjusting the delay the pulse-shaped signals, which are depicted schematically in a power-time diagram 808 might be separated by a certain time interval t3. After adjusting the delay the first and second auxiliary signals are heard simultaneously, as it is depicted schematically in a power-time diagram 810.

In FIG. 9 an embodiment is schematically depicted with a first loudspeaker 902 as a first rendering device and a display 904 as a second rendering device. For the synchronization of the audio with the video device, e.g. a bar 905 might be moved across the screen of the video device from the top to the bottom. The signals are considered to be synchronized when the audio signal is sensed at the same moment when the bar 905 has a predetermined position on the screen 904. For instance, as it is depicted on the right side of FIG. 9 the bar 905 should just be visible in the bottom region of the screen 904 when the audio signal is sensed at a predetermined time t1. The pulse-shaped audio signals are respectively depicted in schematic power-time diagrams 908, 910.

In FIG. 10 it is depicted how two displays 1002 and 1004 are synchronized by using a respective bar 1006, 1008 moving from the top to the bottom of the screen. After adjusting the delay the two bars 1006, 1008 should move simultaneously from the top to the bottom as it is depicted schematically on the right sight, after adjusted delay. Other embodiments, e.g. using flashed images which should flash simultaneously or displaying a curve of an audio signal on a video screen might be used as well for synchronizing two video signals.

Since no additional hardware such as a microphone is used, this method could be used to calibrate surround systems or for audio/video synchronization. The adjustment might be implemented by utilizing a standard infrared remote controlling which is coupled to the input of the control unit.

Thus, a precise method for the calibration and measurement of delay times of rendering devices is proposed. The method allows for simple synchronization of audio and/or video rendering devices and allows the measurement of delay values of rendering devices for verification purposes.

The method is based on sending a clock pulse signal to a pair of devices combined with an adjustment of an artificial delay introduced to one of the signals. The adjustment is performed by a user and is based on the evaluation of simultaneous perception of both signals.

This allows for different calibration tasks such as a audio/video and/or surround sound synchronization. It furthermore enables a simple procedure for delay measurement. The procedures do not require additional hardware such as microphones and can be implemented by a software package installed on a PC.

The invention claimed is:

1. A method for measuring a delay value of a first rendering device using a measuring device, the method comprising the steps of:
   generating a first auxiliary signal and a second auxiliary signal, wherein said first auxiliary signal and said second auxiliary signal are pulse-shaped;
   transmitting said first auxiliary signal to said first rendering device via a first transmission path and said second auxiliary signal to a second rendering device via a second transmission path;
   outputting, to a user, a first audio/video output signal based on said first auxiliary signal, and a second audio/video output signal based on said second auxiliary signal;
   adjusting a delay of at least one of said first transmission path and said second transmission path by synchronizing said first audio/video output signal with said second audio/video output signal in accordance with the user's input;
   determining a delay of said first rendering device in terms of clock cycles of the measuring device by determining said delay of said second transmission path after said step of adjusting;
   acquiring time references from a time server;
   determining a frequency for the clock cycles based on the acquired time references;
   translating the determined delay of the first rendering device in terms of the clock cycles into the delay value based on the determined frequency; and
   outputting said delay value.

2. The method according to claim 1, further comprising:
   determining the delay of the second transmission path before transmitting said first and second auxiliary signals to said first and second rendering devices.

3. The method according to claim 1 or 2, wherein said first auxiliary signal and said second auxiliary signal are based on one common pulse signal.

4. A measuring device that measures a delay value of a first rendering device, the measuring device comprising:
   a signal generator configured to generate a first auxiliary signal and a second auxiliary signal, said first auxiliary signal and said second auxiliary signal being pulse-shaped;
   a first transmitter configured to transmit said first auxiliary signal via a first transmission path;
   a second transmitter configured to transmit said second auxiliary signal via a second transmission path;
   a second rendering device configured to render said second auxiliary signal;
   a delay unit configured to adjust a delay of at least one of said first transmission path and said second transmission path;
   a control unit including an input port, said control unit being configured to adjust a delay of said delay unit in accordance with a user's input received at said input port in terms of clock cycles of the measuring device after the delay unit adjusts the delay of at least one of the first transmission path and the second transmission path; and an output unit configured to output said delay value, wherein the measuring device acquires time references from a time server, determines a frequency for the clock cycles based on the acquired time references, and translates the delay of the delay unit in terms of the clock cycles into the delay value based on the determined frequency.

5. The measuring device according to claim 4, wherein said delay of the second transmission path is controlled to know precisely the value of the delay.

6. The measuring device according to claim 4 or 5, wherein said second rendering device is a display and said second auxiliary signal is a video signal.

7. The measuring device according to claim 4 or 5, wherein said second rendering device is a loudspeaker and said second auxiliary signal is an audio signal.

\* \* \* \* \*